Figure 1:
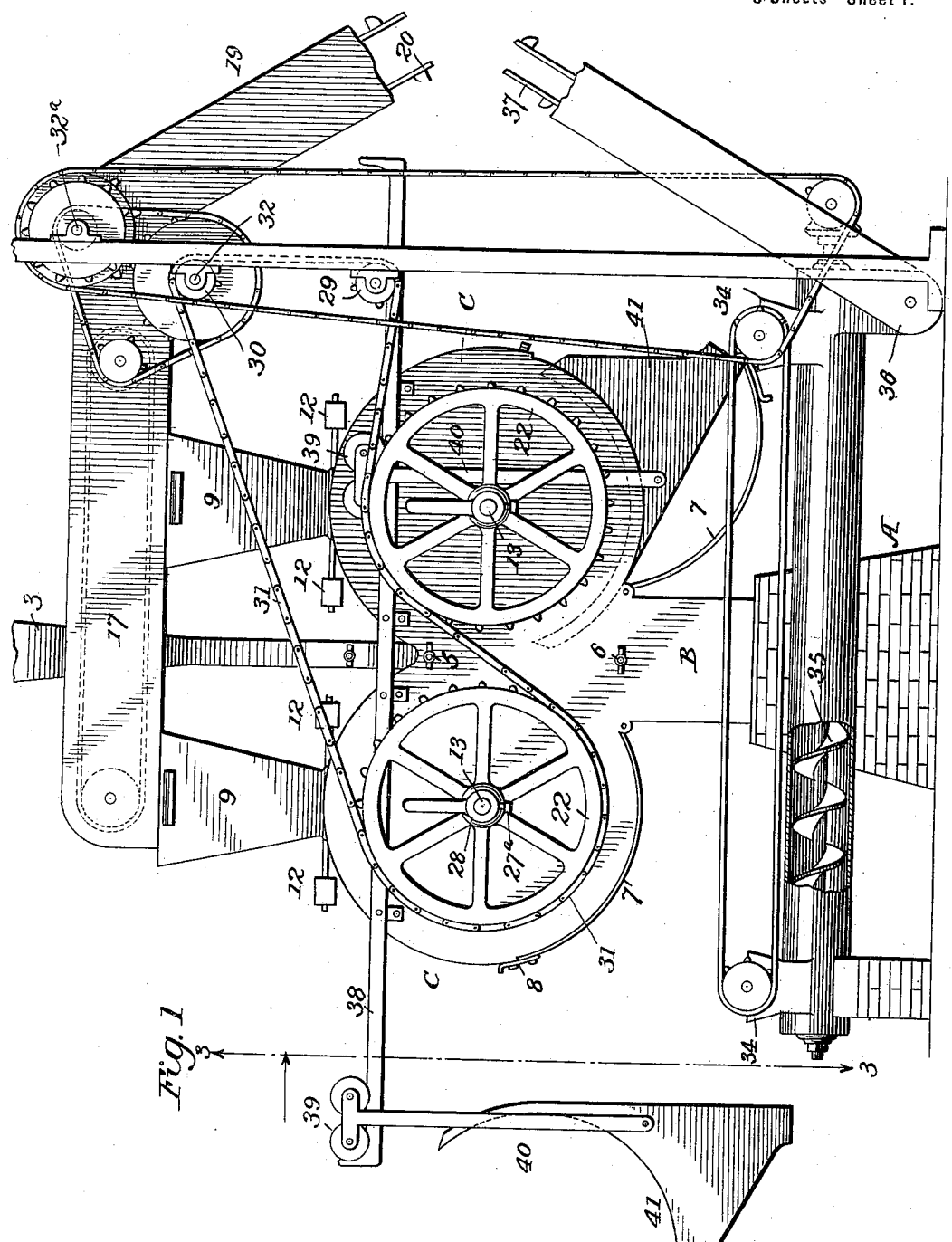

No. 618,644. Patented Jan. 31, 1899.
O. COLLINS.
COTTON SEED ROASTER.
(Application filed Apr. 23, 1898.)
(No Model.) 3 Sheets—Sheet 1.

Witnesses
Inventor
Otis Collins
Attorneys

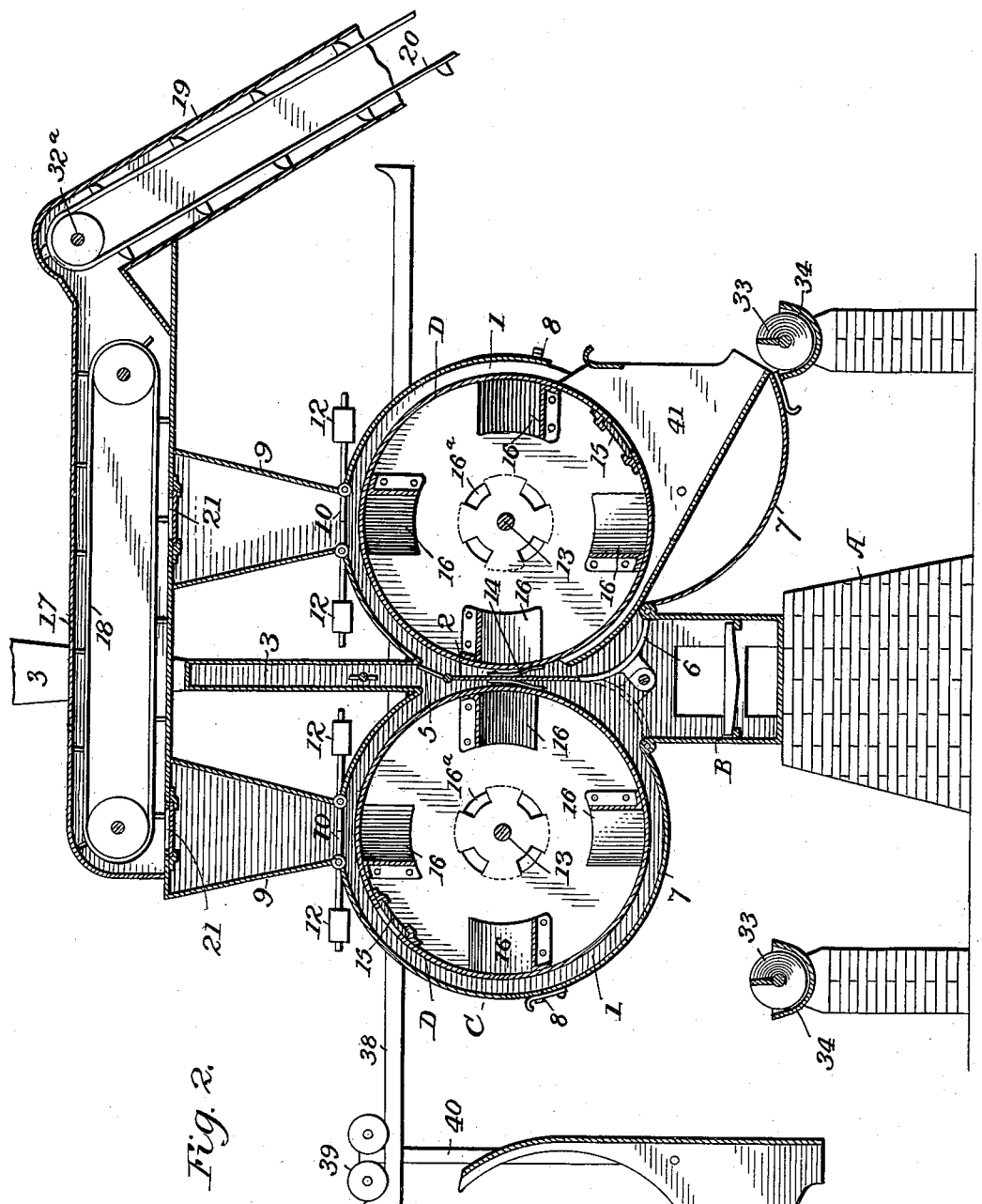

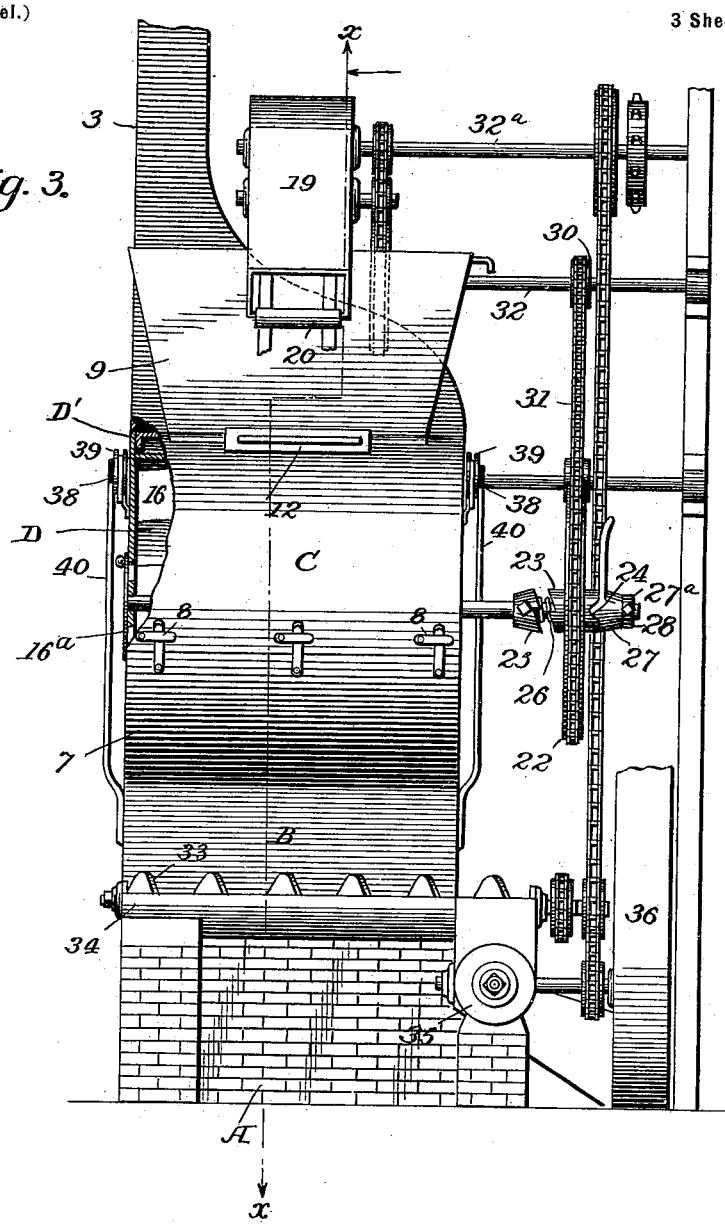

UNITED STATES PATENT OFFICE.

OTIS COLLINS, OF LECOMPTE, LOUISIANA.

COTTON-SEED ROASTER.

SPECIFICATION forming part of Letters Patent No. 618,644, dated January 31, 1899.

Application filed April 23, 1898. Serial No. 678,583. (No model.)

*To all whom it may concern:*

Be it known that I, OTIS COLLINS, a citizen of the United States, residing at Lecompte, in the parish of Rapides and State of Louisiana, have invented certain new and useful Improvements in Cotton-Seed Roasters, of which the following is a specification.

This invention relates to certain new and useful improvements in roasting apparatus for coffee, cotton-seed, or the like, having for its object to provide simple and effective means for conveying the material to and from the roasting chamber or chambers and for subjecting it uniformly to the action of heat while it is being roasted.

It is further an object of the invention to provide means whereby the action of roasting may be carried on continuously.

With these objects in view the invention consists in the novel construction, combination, and arrangement of the parts hereinafter more particularly described.

In the accompanying drawings, forming a part of this specification, and in which like letters of reference designate corresponding parts, Figure 1 is a front elevation of an apparatus embodying the invention. Fig. 2 is a vertical sectional view, and Fig. 3 is an end view, of the apparatus.

Briefly stated, the invention comprises two or more rotary roasting-cylinders inclosed by a suitable casing which communicates with a source of heat—as, for instance, the combustion-chamber of a furnace—the said casing being so arranged that heat is directed over the entire outer surface of the roasting-cylinders, and means are also provided for directing heat over either one or more or simultaneously over all of the cylinders. Coöperating with each of the cylinders is mechanical means for conveying thereto the material to be roasted, and there is also employed means for facilitating the discharge of the material from the said cylinders and for conveying it to the desired point of deposit. Suitable devices are also provided for imparting rotary movement to the roasting-cylinders in the direction of flow of the products of combustion, which devices are so constructed that motion may be imparted to any one or more of the cylinders or to all of them simultaneously, whereby one of the cylinders may remain stationary while the material is supplied thereto or discharged therefrom without interfering with the process of roasting in the remaining cylinders.

Referring to the drawings, A designates a suitable foundation, which may be of masonry, as shown, and supported upon this foundation is a furnace B, of any desired construction. Communicating with the combustion-chamber of the furnace and preferably arranged above the same is the casing C of the roasting-cylinder, the said casing being divided in the present instance into two chambers 1 1 by means of a diaphragm 2. Arranged centrally of the casing C and extending from a point above the diaphragm 2 is a pipe or passage 3, with which both of the chambers of the casing are adapted to communicate, and at the upper edge of the diaphragm is a damper 5, by the adjustment of which either one or both of the chambers of the casing may be placed into communication with the pipe 3. Below the lower end of the diaphragm 2 is an L-shaped damper 6, which is adapted to be swung to close communication between the chambers 1 and to place either or both of said chambers into communication with the furnace-chamber.

At its lower surface the casing C is provided with two hinged segmental sections 7, one for each roasting-chamber, said sections being adapted to be swung down to a position which will permit the roasted material to be discharged from the apparatus. When in their closed positions, the sections 7 are held by suitable catches 8.

Leading into each cylinder of the casing is a chute or hopper 9, each of which is provided at its lower end with dampers 10, which are normally held closed by means of counterweights 12, carried upon arms extending from the ends of the damper-shafts.

Within each chamber of the casing C is a roasting-cylinder D, each of which is fixed upon a central shaft 13, journaled in the front end wall of the casing and having one of its ends projecting beyond said wall. The walls of the cylinders D are parallel with the curved walls of the chambers 1 1, but are separated therefrom to leave a passage for the flow of the products of combustion around the cylinders. The cylinders are, however, so arranged that they approach very closely to the diaphragm 2, and at their peripheries they are engaged by spring-wipers 14, extending from the diaphragm, and these wipers serve to prevent the passage of heat between the diaphragm and cylinders, causing the products of combustion to travel practically wholly around the circumference of the cylinders before escaping through the discharge-pipe, thereby subjecting the whole surface of the cylinders to the heat.

In the side of each cylinder is formed an opening through which the material may be conveyed to or discharged from the cylinders, and preferably this opening is closed by a slide 15, which may be operated from the exterior of the casing C at the rear end thereof. At separated points around the interior of the roasting-cylinders are arranged a series of projecting wings or flanges 16, and these wings may be either straight or curved, and they are set diagonally to the longitudinal center of the cylinder and arranged in such manner that as the cylinders are rotated the material therein is conveyed from the ends of the cylinders toward the centers thereof. The material is also being constantly lifted by said wings, and thereby every portion of it is subjected uniformly to heat.

Provided centrally in the rear ends of the roasting-cylinders are rotary dampers $16^a$, through which air may be admitted into the cylinders to regulate the heat therein or to cool the contents thereof after the material has been sufficiently roasted and the heat has been cut off from the cylinders. It will be apparent also that the material may be inspected through the openings controlled by the said dampers during the process of roasting. At its rear ends the casing C is open to leave the corresponding ends of the roasting-cylinders exposed, the intervening spaces between the cylinders and the casing being closed by means of annular flanges D' projecting from the cylinders and bearing upon the casing.

Above the hoppers 9 is a horizontal casing 17, provided with a suitable endless conveyer 18, and with one end of this casing communicates a second casing 19, in which is also arranged an endless conveyer 20 for lifting the material from a suitable point of supply (not shown) and depositing it into the end of the casing 17, through which it is carried by the conveyer 18 to slide-controlled openings 21, leading from the casing to each of the hoppers 9.

Upon the projecting ends of each of the shafts 13 is loosely mounted a sprocket-wheel 22, carrying upon one side thereof a clutch member 23 and having upon its opposite side a cam-surface 24. There is also fixedly mounted upon the shaft 13, adjacent the clutch member 23, a second clutch member 25, interposed between which and the said clutch member 23 is a coil-spring 26, which normally tends to force the said members apart. Engaging with the cam-surface 24 is a cam 27, adapted to rotate upon the shaft 13 and having a bearing upon a collar 28 at the outer end of the shaft. By means of this cam the clutch may be secured in any position to which it is adjusted upon the shaft.

Extending around one of the sprocket-wheels 22 and over the other and thence around a guide-pulley 29 and over a sprocket-wheel 30 is a sprocket-chain 31. This latter wheel is mounted upon a shaft 32, driven from a main driving-shaft $32^a$, which may be rotated from any suitable source of power. From the above it will be apparent that either or both of the shafts and their roasting-cylinders may be connected to be rotated by turning the cams 27 to cause them to force the clutch member 23 into engagement with the member 25.

Below and parallel to each side of the casing C is a screw conveyer 33, adapted to rotate in an open-topped casing 34. At one end each of the said conveyers 33 communicates with a third screw conveyer 35, which in turn communicates with the lower end of a casing 36, in which is an endless conveyer 37, by means of which the roasted material may be carried to any suitable point of deposit. The conveyers 33 are preferably so arranged in relation to the sides of the casing that when the hinged sections 7 thereof are lowered to open the casing, as shown at the right-hand side of Fig. 2, the ends of said sections bear upon and are supported by the edges of the casings 34.

Parallel to one end of the casing is a stationary track 38, upon which is adapted to travel two carriages 39, one for each roasting-cylinder, and from each of these carriages depends a hanger 40, to the lower end of which is pivoted a chute 41, the opposite side walls of which are provided with curved edges which are adapted to conform to the periphery of the roasting-cylinders when the chutes are in use. From the above it will be apparent that the chutes may be readily and quickly moved into and out of position with very little effort upon the part of the operator. When it is desired to empty the contents of one of the roasting-cylinders its rotation is arrested in the manner hereinbefore described, the dampers 5 and 6 are then adjusted to exclude the heat from the chamber of the cylinder, the hinged casing-section 7 is then opened, and the chute is then brought adjacent the casing, it being swung upon its pivot and its upper end extended into the casing. The curved edges of the chute rest in close conformity with the periphery of the cylinder and its lower end bears upon the end of the hinged section 7 and opens immediately over the casing 34 of the conveyer 33. The slide 15 is now removed, the roasting-cylinder having been previously rotated to bring the opening controlled by said slide opposite the opening in the casing, and the material falls from the cylinder into the chute, thence onto the conveyer 33, which conveys it to the conveyer 35, this conveyer in turn carrying the material to the casing 36, from whence it is elevated to any suitable place of deposit.

The gearing for operating the conveyers 18, 20, 33, 35, and 37 although shown has not been described, as it is believed that the arrangement and operation will be obvious.

From the foregoing description it will be seen that a simple and effective roasting apparatus is provided capable of quickly and uniformly roasting large quantities of various materials, and by means of which apparatus the said material may be easily handled without requiring the services of a large number of operators.

While I have shown and described my improved apparatus as comprising two or more roasting-cylinders, it will be apparent that in some instances the apparatus may be constructed with but a single cylinder, the cylinder being arranged, as in the embodiment of the invention illustrated, so that the product of combustion from the furnace will be directed practically over the whole exterior surface thereof.

Without limiting myself to the precise construction and arrangement of the parts shown and described, since it will be obvious that various changes in such construction and arrangement may be made without departing from the spirit or scope of the invention and some features thereof used without others,

What I claim is—

1. In roasting apparatus, the combination of two chambers communicating with a source of heat, a roasting-cylinder within each chamber, means for rotating the same, and means for disconnecting any one or more of the cylinders from its rotating means and for closing communication between the containing-chamber of the disconnected cylinder and the source of heat, substantially as described.

2. In roasting apparatus, the combination with a casing having a central diaphragm dividing the same into two chambers, dampers above and below the diaphragm, a furnace communicating with the casing below the lower damper, a discharge-pipe leading from above the upper damper, a roasting-cylinder within each of the chambers of the casing, the space between the cylinders and the diaphragm being permanently closed against the passage of heat to the discharge-pipe and means for rotating the cylinders, substantially as described.

3. In a roasting apparatus, the combination with a casing having a central diaphragm dividing the same into two chambers, of a furnace communicating with a casing below the diaphragm, a discharge-pipe leading from the casing above the diaphragm, a roasting-cylinder within each of the chambers of the casing, means for rotating the cylinders and for disconnecting them from such rotating means, means for preventing the flow of heat intermediate the diaphragm and roasting-cylinders, and devices for opening and closing communication between the source of heat and any one or all of the casing-chambers, substantially as described.

4. In a roasting apparatus, the combination with a casing having a hinged section, of a conveyer adjacent said casing adapted to support the end of the section when in a lowered position, a furnace communicating with the casing, and a roasting-cylinder within the casing and means for rotating the same, substantially as described.

5. In a roasting apparatus, the combination with a casing provided with a hinged section, of a conveyer adjacent to the casing, a furnace communicating with the chamber of the casing, a roasting-cylinder within the casing, and means for rotating the same, and a portable chute adapted to be projected into the chamber of the casing and to convey the contents of the roasting-cylinder to the conveyer, substantially as described.

6. In a roasting apparatus, the combination with a casing communicating with a suitable source of heat, of a roasting-cylinder within the casing provided in its side with an opening, means for controlling said opening, a hopper above the casing, a weighted damper within said hopper, an opening in the upper end of the hopper, means for controlling the same, and a conveyer leading to the top of the hopper, substantially as described.

In testimony whereof I have signed my name to this specification in the presence of two subscribing witnesses.

OTIS COLLINS.

Witnesses:
W. J. DUPLISSEY,
J. J. MOORE.